United States Patent
Okamura et al.

(10) Patent No.: US 11,208,358 B2
(45) Date of Patent: Dec. 28, 2021

(54) CUBIC BORON NITRIDE SINTERED BODY AND CUTTING TOOL INCLUDING THE SAME

(71) Applicants: Sumitomo Electric Industries, Ltd., Osaka (JP); SUMITOMO ELECTRIC HARDMETAL CORP., Itami (JP)

(72) Inventors: Katsumi Okamura, Osaka (JP); Yuichiro Watanabe, Osaka (JP); Akito Ishii, Osaka (JP); Takashi Harada, Osaka (JP); Satoru Kukino, Itami (JP)

(73) Assignees: Sumitomo Electric Industries, Ltd., Osaka (JP); SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 17/047,202

(22) PCT Filed: Sep. 18, 2019

(86) PCT No.: PCT/JP2019/036571
§ 371 (c)(1),
(2) Date: Oct. 13, 2020

(87) PCT Pub. No.: WO2020/059756
PCT Pub. Date: Mar. 26, 2020

(65) Prior Publication Data
US 2021/0094882 A1    Apr. 1, 2021

(30) Foreign Application Priority Data
Sep. 19, 2018    (JP) .............................. JP2018-174694

(51) Int. Cl.
C04B 35/5831 (2006.01)
B23B 27/14 (2006.01)
C04B 35/626 (2006.01)
C04B 35/64 (2006.01)
C22C 29/00 (2006.01)
C22C 29/16 (2006.01)

(52) U.S. Cl.
CPC ........ *C04B 35/5831* (2013.01); *B23B 27/148* (2013.01); *C04B 35/6261* (2013.01); *C04B 35/6268* (2013.01); *C04B 35/64* (2013.01); *C22C 29/005* (2013.01); *C22C 29/16* (2013.01); *B23B 2226/125* (2013.01); *C04B 2235/386* (2013.01); *C04B 2235/3813* (2013.01); *C04B 2235/3847* (2013.01); *C04B 2235/402* (2013.01); *C04B 2235/405* (2013.01); *C04B 2235/656* (2013.01)

(58) Field of Classification Search
CPC ............ C04B 35/5831; C04B 35/6261; C04B 35/6268; C04B 35/64; C04B 2235/3813; C04B 2235/3847; C04B 2235/386; C04B 2235/402; C04B 2235/405; C04B 2235/656; C22C 29/005; C22C 29/16; B23B 2226/125; B23B 27/148
See application file for complete search history.

(56) References Cited

U.S. PATENT DOCUMENTS

| | | | |
|---|---|---|---|
| 6,616,725 B2 * | 9/2003 | Cho | ........................ B01J 3/062 419/11 |
| 8,999,511 B2 * | 4/2015 | Kobayashi | .......... C04B 35/6303 428/457 |
| 9,016,987 B2 * | 4/2015 | Okamura | ................... B23C 3/02 409/132 |
| 9,346,716 B2 * | 5/2016 | Okamura | .......... C04B 35/62842 |
| 2007/0032369 A1 | 2/2007 | Franzen | |
| 2008/0016785 A1 | 1/2008 | Kukino et al. | |
| 2008/0214383 A1 | 9/2008 | Matsukawa et al. | |
| 2019/0118344 A1 * | 4/2019 | Dues | ........................ B22F 3/14 |

FOREIGN PATENT DOCUMENTS

| | | |
|---|---|---|
| JP | 2004-331456 A | 11/2004 |
| JP | 2006-169080 A | 6/2006 |
| JP | 2007-39329 A | 2/2007 |
| JP | 2007-70148 A | 3/2007 |
| WO | WO-2005/066381 A1 | 7/2005 |
| WO | WO-2006/112156 A1 | 10/2006 |

* cited by examiner

*Primary Examiner* — Pegah Parvini
*Assistant Examiner* — Ross J Christie
(74) *Attorney, Agent, or Firm* — Feagre Drinker Biddle & Reath LLP

(57) ABSTRACT

Provided is a cubic boron nitride sintered body including more than or equal to 85 volume percent and less than 100 volume percent of cubic boron nitride particles, and a remainder of a binder, wherein the binder contains WC, Co, and an Al compound, the binder contains $W_2Co_{21}B_6$, and, when $I_A$ represents an X-ray diffraction intensity of a (111) plane of the cubic boron nitride particles, $I_B$ represents an X-ray diffraction intensity of a (100) plane of the WC, and $I_C$ represents an X-ray diffraction intensity of a (420) plane of the $W_2Co_{21}B_6$, a ratio $I_C/I_A$ of the $I_C$ to the $I_A$ is more than 0 and less than 0.10, and a ratio $I_C/I_B$ of the $I_C$ to the $I_B$ is more than 0 and less than 0.40.

6 Claims, No Drawings

CUBIC BORON NITRIDE SINTERED BODY AND CUTTING TOOL INCLUDING THE SAME

TECHNICAL FIELD

The present disclosure relates to a cubic boron nitride sintered body, and a cutting tool including the same. The present application claims priority to Japanese Patent Application No. 2018-174694 filed on Sep. 19, 2018, the entire content of which is incorporated herein by reference.

BACKGROUND ART

A cubic boron nitride sintered body (hereinafter also referred to as a "cBN sintered body") is a high-hardness material used for cutting tools and the like. A cBN sintered body is generally made of cubic boron nitride particles (hereinafter also referred to as "cBN particles") and a binder, and tends to have different characteristics depending on the content ratio of the cBN particles.

Thus, in the field of cutting processing, different types of cBN sintered bodies are applied to cutting tools as appropriate, depending on the material of a workpiece, required processing accuracy, and the like. For example, a cBN sintered body having a high content ratio of cubic boron nitride (hereinafter also referred to as "cBN") (hereinafter also referred to as a "high-cBN sintered body") can be suitably used to cut a sintered alloy and the like.

However, sudden chipping tends to occur in a high-cBN sintered body. The sudden chipping is considered to be caused by a weak binding strength between cBN particles and resultant detachment of cBN particles. For example, WO 2005/066381 (PTL 1) discloses a technique of suppressing occurrence of sudden chipping in a high-cBN sintered body by appropriately selecting a binder.

CITATION LIST

Patent Literature

PTL 1: WO 2005/066381

SUMMARY OF INVENTION

A cubic boron nitride sintered body in accordance with one aspect of the present disclosure is a cubic boron nitride sintered body including more than or equal to 85 volume percent and less than 100 volume percent of cubic boron nitride particles, and a remainder of a binder, wherein the binder contains WC, Co, and an Al compound, the binder contains $W_2Co_{21}B_6$, and, when $I_A$ represents an X-ray diffraction intensity of a (111) plane of the cubic boron nitride particles, $I_B$ represents an X-ray diffraction intensity of a (100) plane of the WC, and $I_C$ represents an X-ray diffraction intensity of a (420) plane of the $W_2CO_{21}B_6$, a ratio $I_C/I_A$ of the $I_C$ to the $I_A$ is more than 0 and less than 0.10, and a ratio $I_C/I_B$ of the $I_C$ to the $I_B$ is more than 0 and less than 0.40.

A cubic boron nitride sintered body in accordance with another aspect of the present disclosure is a cubic boron nitride sintered body including more than or equal to 85 volume percent and less than 100 volume percent of cubic boron nitride particles, and a remainder of a binder, wherein the binder contains WC, Co, and an Al compound, and the binder does not contain $W_2CO_{21}B_6$.

A cutting tool in accordance with one aspect of the present disclosure is a cutting tool including the cubic boron nitride sintered body described above.

DETAILED DESCRIPTION

Problem to be Solved by the Present Disclosure

In recent years, with a rapid increase in the functionality of mechanical components, it becomes increasingly difficult to cut workpieces serving as such mechanical components. Accordingly, the problem of cost increase due to shortened life of cutting tools becomes apparent. Thus, further improvement in a high-cBN sintered body is desired. In view of this, an object of the present disclosure is to provide a cubic boron nitride sintered body that can have a long life, and a cutting tool including the same.

Advantageous Effect of the Present Disclosure

According to the cubic boron nitride sintered body described above, it can have a long life, and the cutting tool including the same can also have a long life.

Description of Embodiments of the Present Disclosure

In order to complete a cBN sintered body that can have a longer life, first, the present inventors have decided to use binder source material powder containing WC (tungsten carbide), Co (cobalt), and Al (aluminum) as a source material for a binder in a high-cBN sintered body, because they have found through their studies so far that an excellent cBN sintered body can be obtained when such binder source material powder is used. However, the present inventors have thought that, in order to further improve this cBN sintered body and achieve a breakthrough, an approach different from a conventional technique of improving the blending ratio of a binder or the like is required.

Accordingly, in order to search for the best approach, first, the present inventors have sintered mixed powder of the binder source material powder described above and cBN source material powder as a source material for cBN particles to fabricate a cBN sintered body. In the cBN sintered body, binding of cBN particles tends to be observed in a relatively large amount. This is because, during sintering, B (boron) and N (nitrogen) are dissolved from the surface of the cBN source material powder close to Co and diffused, and thereafter, dissolved B and N are re-precipitated and reach an adjacent cBN particle. In the specification of the present application, such a function performed by a binder is also referred to as a "catalyst function".

Next, the present inventors have performed XRD (X-ray diffraction measurement) and ICP (inductively coupled high-frequency plasma spectrometry) to examine compositions of compounds contained in the above cBN sintered body, and have found the existence of $W_2Co_{21}B_6$, which is an unintended compound. Although the mechanism of generating $W_2Co_{21}B_6$ is not clear, it is presumed as follows.

WC also exists in a region where dissolution (diffusion) and re-precipitation of B and N as described above occur. This WC is involved in the dissolution (diffusion) and re-precipitation described above. This leads to detachment of C (carbon) from the WC and entrance of Co and B into a portion from which the C has detached. Accordingly, an unintended reactant such as $W_2Co_{21}B_6$ is generated as a result.

Here, the present inventors have made a hypothesis that $W_2Co_{21}B_6$ serves as an origin of detachment of a cBN particle, because, according to the generation mechanism presumed as described above, it is presumed that $W_2Co_{21}B_6$ is a brittle substance which is significantly inferior in machine characteristics such as hardness and strength, when compared with other binders such as WC, and a cBN particle located adjacent to $W_2Co_{21}B_6$ has a disordered crystal structure. Based on the above hypothesis, the present inventors have repeated consideration to find a method for suppressing generation of $W_2Co_{21}B_6$.

As a result, the present inventors have found that generation of $W_2Co_{21}B_6$ is suppressed by bonding an organic substance to cBN source material powder to fabricate organic cBN powder, and using the organic cBN powder to manufacture a cBN sintered body. In addition, as a supporting fact to the above hypothesis, detachment of cBN particles is significantly suppressed in the cBN sintered body in which generation of $W_2Co_{21}B_6$ is suppressed.

The present disclosure has been completed based on the above findings. In the following, aspects of the present disclosure will be described in list form.

[1] A cubic boron nitride sintered body in accordance one aspect of the present disclosure is a cubic boron nitride sintered body including more than or equal to 85 volume percent and less than 100 volume percent of cubic boron nitride particles, and a remainder of a binder, wherein the binder contains WC, Co, and an Al compound, the binder contains $W_2Co_{21}B_6$, and, when $I_A$ represents an X-ray diffraction intensity of a (111) plane of the cubic boron nitride particles, $I_B$ represents an X-ray diffraction intensity of a (100) plane of the WC, and $I_C$ represents an X-ray diffraction intensity of a (420) plane of the $W_2Co_{21}B_6$, a ratio $I_C/I_A$ of the $I_C$ to the $I_A$ is more than 0 and less than 0.10, and a ratio $I_C/I_B$ of the $I_C$ to the $I_B$ is more than 0 and less than 0.40.

It is understood from the content amount (content ratio) of the cBN particles that the cBN sintered body is a "high-cBN sintered body" in which detachment of the cBN particles is likely to occur. In a conventional high-cBN sintered body, both the ratio $I_C/I_A$ and the ratio $I_C/I_B$ do not satisfy the above ranges. This is because, since a relatively large amount of $W_2Co_{21}B_6$ exists in the conventional high-cBN sintered body, the ratio $I_C/I_A$ is more than 0.10 and the ratio $I_C/I_B$ is more than 0.40. It should be noted that, in the specification of the present application, the "conventional high-cBN sintered body" means a high-cBN sintered body obtained by a conventional manufacturing method (that is, a method which does not perform bonding of an organic substance) using binder source material powder containing WC, Co, and an Al compound as a source material for a binder.

In contrast, in the cBN sintered body in accordance with the present disclosure, the ratio $I_C/I_A$ is less than 0.10 and the ratio $I_C/I_B$ is less than 0.40, unlike the conventional high-cBN sintered body. That is, the cBN sintered body in accordance with one aspect of the present disclosure has a smaller content amount of $W_2Co_{21}B_6$, which is an unintended compound, when compared with the conventional high-cBN sintered body, and thereby can have a long life. This seems to be because, since the cBN sintered body has a smaller content amount of $W_2Co_{21}B_6$, which serves as an origin of detachment of a cBN particle, detachment of the cBN particles occurs less frequently.

In the cubic boron nitride sintered body, the ratio $I_C/I_A$ is more than 0 and less than 0.05, and the ratio $I_C/I_B$ is more than 0 and less than 0.20. In this case, the cubic boron nitride sintered body can have a further long life.

A cubic boron nitride sintered body in accordance one aspect of the present disclosure is a cubic boron nitride sintered body including more than or equal to 85 volume percent and less than 100 volume percent of cubic boron nitride particles, and a remainder of a binder, wherein the binder contains WC, Co, and an Al compound, and the binder does not contain $W_2Co_{21}B_6$. In this case, the cubic boron nitride sintered body can have a further long life.

A cutting tool in accordance one aspect of the present disclosure is a cutting tool including the cubic boron nitride sintered body described above. The cutting tool can have a long life.

DETAILS OF EMBODIMENTS OF THE PRESENT DISCLOSURE

One embodiment of the present disclosure (hereinafter referred to as the "present embodiment") will be described below, although the present embodiment is not limited thereto. It should be noted that, in the present specification, an expression in the form of "A to Z" means lower and upper limits of a range (that is, more than or equal to A and less than or equal to Z), and when A is not accompanied by any unit and Z is alone accompanied by a unit, A has the same unit as Z.

First Embodiment cBN Sintered Body

A cBN sintered body in accordance with the present embodiment includes more than or equal to 85 volume percent and less than 100 volume percent of cBN particles, and a remainder of a binder. That is, the cBN sintered body in accordance with the present embodiment is a so-called high-cBN sintered body. It should be noted that the cBN sintered body can include an inevitable impurity resulting from the used source material, manufacturing conditions, and the like. On this occasion, it can be understood that the inevitable impurity is contained in the binder.

The content ratio (in volume percent) of the cBN particles in the cBN sintered body is substantially the same as the content ratio (in volume percent) of cBN source material powder used for mixed powder described later, because the amount of change in volume caused by bonding of an organic substance or the like is extremely small relative to the volume of the cBN powder itself. Therefore, the content amount (content ratio) of the cBN particles in the cBN sintered body can be prepared within a desired range by controlling the content ratio of the cBN source material powder used for the mixed powder.

In addition, the content ratio (in volume percent) of the cBN particles in the cBN sintered body can also be confirmed by performing texture observation, elemental analysis, and the like on the cBN sintered body using quantitative analysis by means of ICP, a scanning electron microscope (SEM)-accompanying energy dispersive X-ray analyzer (EDX), or a transmission electron microscope (TEM)-accompanying EDX. In the present embodiment, the content ratio of the cBN particles in the cBN sintered body is determined by a method by using a SEM described later, unless there is some particular reason.

For example, in a case where a SEM is used, the content ratio (in volume percent) of the cBN particles can be determined as described below. First, the cBN sintered body is cut at an arbitrary position to fabricate a sample including a cross section of the cBN sintered body. To fabricate the cross section, a focused ion beam device, a cross section polisher device, and the like can be used. Then, the cross section is observed with the SEM at a magnification of 2000 times to obtain a reflected electron image. In the reflected electron image, a region where a cBN particle exists appears as a black region, and a region where the binder exists appears as a gray region or a white region.

Then, binarization processing is performed on the reflected electron image using image analysis software (for example, "WinROOF" manufactured by Mitani Corporation), and each area ratio is calculated from the image subjected to the binarization processing. By considering the calculated area ratio as a volume percent, the content ratio (in volume percent) of the cBN particles can be determined. It should be noted that the volume percent of the binder can be thereby determined simultaneously.

cBN Particles

The cBN particles have high hardness, strength, and toughness, and function as a framework in the cBN sintered body. $D_{50}$ (average particle diameter) of the cBN particles is not particularly limited, and can be 0.1 to 10.0 µm, for example. Generally, there is a tendency that, the smaller $D_{50}$ is, the higher the hardness of the cBN sintered body is. There is also a tendency that, the smaller the variation in particle diameter is, the more uniform the properties of the cBN sintered body are. $D_{50}$ of the cBN particles is preferably 0.5 to 4.0 µm, for example.

$D_{50}$ of the cBN particles is determined as described below. First, according to the method of determining the content amount of the cBN particles described above, a sample including a cross section of the cBN sintered body is fabricated, and a reflected electron image is obtained. Then, an equivalent circle diameter of each black region in the reflected electron image is calculated using image analysis software. It is preferable to calculate equivalent circle diameters of 100 or more cBN particles by observing five or more fields of view.

Subsequently, the equivalent circle diameters are arranged in ascending order from the minimum value to the maximum value, to obtain cumulative distribution.

The particle diameter at which the cumulative area accounts for 50% in the cumulative distribution is defined as $D_5O$. It should be noted that an equivalent circle diameter means the diameter of a circle having the same area as the measured area of a cBN particle.

Binder

The binder functions to allow the cBN particles, which are a material difficult to be sintered, to be sintered at industrial-level pressure and temperature. In addition, since the reactivity between the binder and iron is lower than the reactivity between cBN and iron, the binder imparts the effect of suppressing chemical wear and thermal wear during cutting of high-hardness hardened steel to the cBN sintered body. In addition, when the cBN sintered body contains the binder, wear resistance during highly efficient processing of the high-hardness hardened steel is improved.

In the present embodiment, the binder contains WC, Co, and an Al compound. Here, the "Al compound" means a compound containing Al as a constituent element. Examples of the Al compound include CoAl, $Al_2O_3$, AlN, $AlB_2$, composite compounds thereof, and the like. The binder containing WC, Co, and the Al compound is considered to be particularly effective to extend the life of the cBN sintered body in accordance with the present embodiment, for the following reason.

First, since Co and Al have a catalyst function, they can promote neck growth of the cBN particles in a sintering step described later. Second, WC is presumed to be effective to bring the thermal expansion coefficient of the binder close to the thermal expansion coefficient of the cBN particles.

The binder can include $W_2Co_{21}B_6$, in addition to WC, Co, and the Al compound. However, in the cBN sintered body, it is preferable that the amount of $W_2CO_{21}B_6$ contained in the binder is small, and it is more preferable that the binder does not contain $W_2Co_{21}B_6$. The present inventors have confirmed that the cBN sintered body can have a long life when the amount of $W_2Co_{21}B_6$ contained in the binder is small, and the cBN sintered body can have a further long life when the binder does not contain $W_2Co_{21}B_6$.

In addition, the binder can include $Co_3W_3C$ and $Co_4W_2C$, in addition to WC, Co, and the Al compound. Also for $Co_3W_3C$ and $Co_4W_2C$, it is preferable that the amount thereof in the binder is small, and it is more preferable that the binder does not contain them, as with $W_2Co_{21}B_6$.

It should be noted that the description "the binder does not contain $W_2Co_{21}B_6$" means that an X-ray peak originating from a (420) plane of $W_2Co_{21}B_6$ is not observed when measurement of X-ray diffraction intensity described later is performed on the cBN sintered body. Similarly, the description "the binder does not contain $Co_3W_3C$" means that an X-ray peak originating from a (333) plane of $Co_3W_3C$ is not observed when the above measurement is performed. The description "the binder does not contain $Co_4W_2C$" means that an X-ray peak originating from a (221) plane of $Co_4W_2C$ is not observed when the above measurement is performed.

The composition of the binder contained in the cBN sintered body can be specified by combining XRD and ICP. Specifically, first, a test piece having a thickness of about 0.45 to 0.50 mm is cut out from the cBN sintered body. XRD analysis is performed on the cut-out test piece to determine a compound, a metal, or the like determined from an X-ray diffraction peak. Then, the test piece is immersed in nitric hydrofluoric acid (a mixed acid having a mixing volume ratio of concentrated nitric acid (60%):distilled water:concentrated hydrofluoric acid (47%)=2:2:1) within a sealed container, to obtain an acid treatment liquid in which the binder is dissolved. ICP analysis is performed on the acid treatment liquid, and quantitative analysis of each metal element is performed. Then, the composition of the binder is determined by analyzing the result of the XRD and the result of the ICP analysis.

The binder in the present embodiment may include another binder, in addition to WC, Co, and the Al compound. Examples of elements suitable as the other binder include Ni, Fe, Cr, Mn, Ti, V, Zr, Nb, Mo, Hf, Ta, Re, and the like.

X-ray Diffraction Intensity Ratio

In the cBN sintered body in accordance with the present embodiment, in a case where the binder contains $W_2Co_{21}B_6$, when $I_A$ represents an X-ray diffraction intensity of a (111) plane of the cBN particles, $I_B$ represents an X-ray diffraction intensity of a (100) plane of WC, and $I_C$ represents an X-ray diffraction intensity of a (420) plane of $W_2Co_{21}B_6$, a ratio $I_C/I_A$ is less than 0.10, and a ratio $I_C/I_B$ is less than 0.40.

In one aspect of the present embodiment, the ratio $I_C/I_A$ may be more than 0 and less than 0.10, and the ratio $I_C/I_B$ may be more than 0 and less than 0.40.

The ratio $I_C/I_A$ and the ratio $I_C/I_B$ are calculated as described below. First, a test piece having a thickness of about 0.45 to 0.50 mm is cut out from the cBN sintered body. XRD analysis is performed on the cut-out test piece at five or more arbitrary points to measure the X-ray diffraction intensity of the (111) plane of the cBN particles, the X-ray diffraction intensity of the (100) plane of WC, and the X-ray diffraction intensity of the (420) plane of $W_2Co_{21}B_6$. Then, average values of the respective X-ray diffraction intensities measured at the respective points are calculated, and the respective average values are defined as $I_A$, $I_B$, and $I_C$. The measurement conditions are as described below. The respective ratios described above are calculated from the obtained three values.

X-ray diffraction device: "SmartLab" (trade name) manufactured by Rigaku Corporation
  Characteristic X-ray: Cu—Kα
  Tube voltage: 45 kV
  Tube current: 200 mA
  X-ray diffraction method: 0-2θ method
  X-ray irradiation range: A range having a diameter of about 0.3 mm is irradiated with an X-ray, using a pinhole collimator.

Function and Effect

According to the cBN sintered body in accordance with the present embodiment described above, a long life can be achieved. The reason therefor is presumed as follows. While $W_2Co_{21}B_6$ contained in the binder serves as an origin of detachment of a cBN particle, the cBN sintered body in accordance with the present embodiment has a smaller content amount of $W_2Co_{21}B_6$, when compared with a conventional cBN sintered body, and thus detachment of the cBN particles is suppressed, and thereby a long life can be achieved.

In the cBN sintered body in accordance with the present embodiment, it is preferable that the ratio $I_C/I_A$ is less than 0.05, and the ratio $I_C/I_B$ is less than 0.20, and it is more preferable that the ratio $I_C/I_A$ is more than 0 and less than 0.05, and the ratio $I_C/I_B$ is more than 0 and less than 0.20. It is further preferable that each of the ratio $I_C/I_A$ and the ratio $I_C/I_B$ is 0, that is, the binder does not contain $W_2Co_{21}B_6$. In this case, origins of detachment of the cBN particles are further decreased, and thus the cBN sintered body in accordance with the present embodiment can have a further long life.

Second Embodiment

Cutting Tool

A cutting tool in accordance with the present embodiment includes the cBN sintered body described above. In one aspect of the present embodiment, the cutting tool includes the cBN sintered body as a base material. In addition, the cutting tool in accordance with the present embodiment may have a film on a portion or all of the surface of the cBN sintered body serving as the base material.

The shape and use of the cutting tool in accordance with the present embodiment are not particularly limited. Examples of the cutting tool can include a drill, an end mill, a cutting edge-replaceable cutting tip for drills, a cutting edge-replaceable cutting tip for end mills, a cutting edge-replaceable cutting tip for milling, a cutting edge-replaceable cutting tip for turning, a metal saw, a gear cutting tool, a reamer, a tap, a tip for crankshaft pin milling, and the like.

In addition, the cutting tool in accordance with the present embodiment is not limited to a cutting tool which is entirely made of a cBN sintered body, but also includes a cutting tool in which only a portion (in particular, a cutting edge portion (cutting blade portion) or the like) thereof is made of a cBN sintered body. For example, a cutting tool in which only a cutting edge portion of a base body (support body) made of cemented carbide or the like is composed of a cBN sintered body is also included in the cutting tool in accordance with the present embodiment. In this case, literally, the cutting edge portion is regarded as a cutting tool. In other words, even when a cBN sintered body accounts for only a portion of a cutting tool, the cBN sintered body is referred to as a cutting tool.

Since the cutting tool in accordance with the present embodiment includes the cBN sintered body described above, the cutting tool can have a long life.

Third Embodiment

Method for Manufacturing cBN Sintered Body

A method for manufacturing the cBN sintered body in accordance with the present embodiment will be described. The method for manufacturing the cBN sintered body in accordance with the present embodiment is a method for manufacturing the cBN sintered body in accordance with the first embodiment.

Specifically, the method for manufacturing the cBN sintered body in accordance with the present embodiment at least includes: a step of fabricating organic cBN powder formed by bonding an organic substance to cBN source material powder (fabrication step); a step of mixing the organic cBN powder and binder source material powder containing WC, Co, and Al and thereby preparing mixed powder composed of more than or equal to 85 volume percent and less than 100 volume percent of the organic cBN powder and a remainder of the binder source material powder (preparation step); and a step of sintering the mixed powder and thereby obtaining a cBN sintered body (sintering step). In the following, each step will be described in detail.

Fabrication Step

The present step is a step of fabricating organic cBN powder formed by bonding an organic substance to cBN source material powder.

The cBN source material powder is source material powder of cBN particles to be contained in the cBN sintered body. Examples of a method of bonding an organic substance to the cBN source material powder include a method by using supercritical water, a method by performing plasma treatment, and the like.

Method by Using Supercritical Water

A method by using supercritical water will be described. In this method, for example, a step of introducing the cBN source material powder and an organic substance into supercritical water is performed. Thereby, the organic cBN powder can be fabricated. It should be noted that, in the present specification, the supercritical water means water in a supercritical state or a subcritical state.

Examples of a method of introducing the cBN source material powder and the organic substance into the supercritical water include a method of introducing the cBN source material powder and the organic substance in this order into the supercritical water, a method of introducing the organic substance and the cBN source material powder in this order into the supercritical water, and a method of introducing the cBN source material powder and the organic substance simultaneously into the supercritical water. With these methods, the surface of the cBN source material powder is cleaned by the contact between the cBN source material powder and the supercritical water. In addition, by the contact between the organic substance and the cBN source material powder having the cleaned surface (hereinafter also referred to as a "clean surface"), the organic substance is bonded to the clean surface of the cBN source material powder.

Method by Performing Plasma Treatment

A method by performing plasma treatment will be described. In this method, a step of bonding an organic substance to the cBN source material powder by plasma treatment is performed. Specific examples include a method of exposing the cBN source material powder to an atmosphere of a first gas containing carbon and thereafter exposing the cBN source material powder to an atmosphere of a second gas containing ammonia within a plasma generation device. As the first gas, $CF_4$, $CH_4$, $C_2H_2$, or the like can be used. As the second gas, $NH_3$, a mixed gas of $N_2$ and $H_2$, or the like can be used.

With these methods, by exposing the cBN source material powder to the atmosphere of the first gas, the surface of the cBN source material powder is etched and a clean surface is formed, and carbon (the first gas) is bonded to the clean surface. By continuously exposing the carbon-bonded cBN source material powder to the atmosphere of the second gas, the carbon is terminated with ammonia. Thereby, as a result, an organic substance containing carbon and nitrogen is bonded to the clean surface.

As described above, the organic cBN powder can be fabricated by any of the method by using supercritical water and the method by performing plasma treatment. In the present step, it is preferable to adopt the method by using supercritical water, because the method easily uniformizes the organic substance bonded to the cBN source material powder, and thus easily uniformizes the organic cBN powder.

In the present step, an average particle diameter of the cBN source material powder is not particularly limited. From the viewpoint of forming a cBN sintered body which has a high strength and also has a high wear resistance and a high chipping resistance, the average particle diameter of the cBN source material powder is preferably 0.1 to 10 µm, and more preferably 0.5 to 5.0 µm.

When the present step is performed by using supercritical water, examples of a preferable organic substance to be used include amine and hydrocarbon compounds having a carbon number of 5 or more. Among them, hexylamine, hexylnitrile, paraffin, and hexane are more preferable, and hexylamine is further preferable. The present inventors have confirmed that using these organic substances significantly reduces detachment of the cBN particles in the cBN sintered body. When the present step is performed by using plasma treatment, examples of the organic substance to be bonded include amine, hydrogen fluoride, and the like.

A preferable amount of the organic substance bonded to the cBN source material powder varies depending on particle diameters of the cBN source material powder. For example, when hexylamine is used as the organic substance, it is preferable to bond 50 to 2000 ppm of hexylamine to cBN source material powder having an average particle diameter of 1 to 10 µm, and it is preferable to bond 100 to 5000 ppm of hexylamine to cBN source material powder having an average particle diameter of 0.1 to 1 µm. In such a case, there is a tendency that a desired cBN sintered body is efficiently manufactured. The amount of the organic substance bonded to the organic cBN powder can be measured by gas chromatography mass spectroscopy, for example.

Here, in the present embodiment, it is considered to be only necessary that carbon enough to supplement or suppress detachment of C (carbon) from WC exists in the organic cBN powder which is subjected to a second step of the sintering step described later. In addition, the amount of the organic substance bonded to the cBN source material powder tends to be reduced through subsequent steps (for example, a purification step, the preparation step, and the like described later). Accordingly, it is considered that, even if the amount of the organic substance bonded to the cBN source material powder is an amount other than that described above, for example, is an excessive amount, a sufficient amount of carbon can be caused to remain in the organic cBN powder which is subjected to the second step, by appropriate preparation during each treatment in the subsequent steps.

Purification Step

In using the organic cBN powder obtained by the fabrication step described above for the preparation step described below, it is preferable to remove an impurity from the organic cBN powder. Examples of the impurity include an unreacted organic substance. By removing the unreacted organic substance, an unintended reaction in the preparation step and/or the sintering step can be suppressed.

For example, when the supercritical water is used, the organic cBN powder is obtained as slurry. In this case, the unreacted organic substance can be separated from the organic cBN powder by performing centrifugation on the slurry.

In addition, organic cBN source material powder extracted from the supercritical water, or organic cBN source material powder extracted from the supercritical water and thereafter subjected to the centrifugation described above or the like may be further subjected to heat treatment (for example, at 850° C. or more under vacuum). Thereby, an impurity such as moisture adsorbed on the surface of the organic cBN powder can be removed.

Here, the present inventors initially had a concern that, when heat treatment was performed on the organic cBN powder, all the organic substance bonded to the cBN source material powder might volatilize and/or disappear. Surprisingly, however, it has been confirmed as a result of observation of the organic cBN powder by Auger electron spectroscopy that, although the organic substance is decomposed through heat treatment, carbon uniformly remains on the surface of the organic cBN powder. This carbon is considered to be derived from the organic substance.

That is, it has been confirmed that, by performing heat treatment on the organic cBN powder, the impurity on the surface of the organic cBN powder is removed, and in addition, surface-modified organic cBN powder having a surface to which carbon is uniformly bonded is obtained. Although this mechanism is unknown, the present inventors have an assumption that, since the clean surface formed through treatment using supercritical water, plasma, or the like has a significantly high activity and thereby the organic substance is very strongly bound to the clean surface, and this strong binding is involved in the surface modification of the organic cBN powder.

Preparation Step

The present step is a step of mixing the organic cBN powder and binder source material powder containing WC, Co, and Al and thereby preparing mixed powder composed of more than or equal to 85 volume percent and less than 100 volume percent of the organic cBN powder and a remainder of the binder source material powder. The organic cBN powder is the organic cBN powder obtained by the fabrication step described above, and the binder source material powder is a source material for a binder to be contained in the cBN sintered body.

The binder source material powder can be prepared as described below. First, WC powder, Co powder, and Al powder are prepared. Then, these powders are mixed to have a predetermined ratio, and are heat-treated (for example, at 1200° C.) under vacuum to fabricate an intermetallic compound. The intermetallic compound is pulverized by a wet ball mill, a wet bead mill, or the like to prepare binder source material powder containing WC, Co, and Al. It should be noted that, although the method of mixing these powders is not particularly limited, ball mill mixing, bead mill mixing, planetary mill mixing, jet mill mixing, and the like are preferable from the viewpoint of efficiently uniformly mixing these powders. Each mixing method may be of a wet type or a dry type.

Preferably, the organic cBN powder and the prepared binder source material powder are mixed by wet ball mill mixing using ethanol, acetone, or the like as a solvent. In addition, after mixing, the solvent is removed by natural drying. Preferably, an impurity such as moisture adsorbed on the surface is thereafter removed by heat treatment (for example, at 850° C. or more under vacuum). Thereby, the organic substance is decomposed and carbon derived from the organic substance can uniformly remain on the surface of the organic cBN powder as described above, and thus surface-modified organic cBN powder can be obtained. In this manner, the mixed powder is prepared.

In addition to WC, Co, and Al, the binder source material powder may also contain another element. Examples of elements suitable as the other element include Ni, Fe, Cr, Mn, Ti, V, Zr, Nb, Mo, Hf, Ta, Re, and the like.

Sintering Step

The present step is a step of sintering the mixed powder and thereby obtaining a cBN sintered body. In the present step, the mixed powder is exposed to high temperature and voltage conditions and is sintered, and thereby the cBN sintered body is manufactured.

Specifically, first, as a first step, the mixed powder is charged into a container and is vacuum-sealed, preferably at a temperature of 850° C. or more. This is a temperature which is more than the melting point of a sealant, and is a temperature sufficient to decompose the organic substance bonded to the organic cBN powder and cause carbon derived from the organic substance to uniformly remain on the surface of the organic cBN powder.

Then, as a second step, the vacuum-sealed mixed powder is sintered using a super-high temperature and pressure device. Although sintering conditions are not particularly limited, 5.5 to 8 GPa and more than or equal to 1500° C. and less than 2000° C. are preferable. In particular, 6 to 7 GPa and 1600° C. to 1900° C. are preferable from the viewpoint of the balance between cost and sintering performance.

When heat treatment (heat treatment in the purification step and/or heat treatment in the preparation step) is performed before the present step, surface-modified organic cBN powder in which carbon uniformly remains on the surface of the organic cBN powder is subjected to the first step. When heat treatment is not performed before the present step, surface-modified organic cBN powder is prepared by the first step, that is, vacuum-sealing. Accordingly, carbon uniformly exists on the surface of the organic cBN powder which is subjected to the second step. The mixed powder containing such organic cBN powder undergoes the second step, and thereby the cBN sintered body is manufactured.

Function and Effect

According to the method for manufacturing the cBN sintered body in accordance with the present embodiment described above, a cBN sintered body that can have a long life can be manufactured. The reason therefor is presumed as follows.

When the organic cBN powder is sintered, detachment of C (carbon) from WC is supplemented by organic substance-derived carbon uniformly bonded to the surface of the organic cBN powder, or detachment of C from WC is suppressed by the existence of organic substance-derived carbon. Accordingly, entrance of Co and B into WC is also suppressed. Thus, as a result, generation of $W_2Co_{21}B_6$ is suppressed.

That is, the manufactured cBN sintered body has a smaller content amount of $W_2Co_{21}B_6$, which is considered as an origin of detachment of a cBN particle, or does not contain $W_2Co_{21}B_6$. Thus, the cBN sintered body can have a long life.

The above description includes features noted below.

Note 1

A cubic boron nitride sintered body comprising more than or equal to 85 volume percent and less than 100 volume percent of cBN particles, and a remainder of a binder, wherein
the binder contains WC, Co, and an Al compound,
the binder may contain $W_2Co_{21}B_6$, and
In a case where the binder contains the $W_2Co_{21}B_6$, when $I_A$ represents an X-ray diffraction intensity of a (111) plane of the cubic boron nitride, $I_B$ represents an X-ray diffraction intensity of a (100) plane of the WC, and $I_C$ represents an X-ray diffraction intensity of a (420) plane of the $W_2Co_{21}B_6$, a ratio $I_C/I_A$ of the $I_C$ to the $I_A$ is less than 0.10, and a ratio $I_C/I_B$ of the $I_C$ to the $I_B$ is less than 0.40.

Note 2

The cubic boron nitride sintered body according to note 1, wherein
the ratio $I_C/I_A$ is less than 0.05, and
the ratio $I_C/I_B$ is less than 0.20.

13

Note 3

The cubic boron nitride sintered body according to note 1 or 2, wherein the binder does not contain the $W_2Co_{21}B_6$.

Note 4

A cutting tool comprising the cubic boron nitride sintered body according to any one of notes 1 to 3.

EXAMPLES

In the following, the present invention will be described in more detail with reference to examples, although the present invention is not limited thereto.

Experiment Example 1

First, organic cBN powder was fabricated. Specifically, first, supercritical water was fabricated under the following conditions, using a supercritical water synthesis device ("MOMI Super mini" manufactured by ITEC Co., Ltd.).
Pressure: 40 MPa
Temperature: 388° C.
Flow velocity: 2 ml/minute.

Then, a stock solution of hexylamine was continuously introduced into the above device such that hexylamine in the supercritical water had a concentration of 6.7 weight percent. Further, cBN source material powder having an average particle diameter of 2.5 μm was continuously introduced into the above device such that the cBN source material powder in the supercritical water had an amount of 8 weight percent. Thereby, the cBN source material powder and hexylamine as an organic substance were introduced into the supercritical water.

After the above supercritical water treatment was continued for 120 minutes, the temperature and pressure inside the device were returned to ordinary temperature and pressure and the supercritical water treatment was terminated, and the entire amount of obtained slurry was collected. The slurry was subjected to centrifugation (at 10000 rpm for 10 minutes) to separate excess hexylamine which was not bonded to the cBN source material powder. The concentrated slurry after the separation was dried (at −90° C. for 10 hours) to collect about 15 g of powder subjected to the supercritical water treatment.

In this manner, organic cBN powder was fabricated. When the fabricated organic cBN powder was subjected to gas chromatography mass spectroscopy, it was confirmed that 321 ppm of hexylamine existed with respect to the cBN powder (was bonded to the cBN powder).

Then, binder source material powder serving as a source material for a binder was prepared. Specifically, WC powder, Co powder, and Al powder were prepared and blended at a ratio of WC:Co:Al=50:43:7 in weight percent. It should be noted that each powder had an average particle diameter of 2 μm. The blended powders were heat-treated (at 1200° C. under vacuum for 30 minutes) to be uniformized, and then were pulverized by a cemented carbide ball mill. Thereby, binder source material powder having an average particle diameter of 1 μm was obtained.

The organic cBN powder and the obtained binder source material powder were blended at a ratio of the organic cBN powder:the binder source material powder=85:15 in volume percent, and were uniformly mixed by a wet ball mill method using ethanol. Then, the mixed powders were heat-treated at 900° C. under vacuum. When the heat-treated organic cBN powder was analyzed by Auger electron spectroscopy, it was confirmed that carbon remained on the surface thereof. In this manner, mixed powder was fabricated.

Then, the obtained mixed powder was sintered to manufacture a cBN sintered body. Specifically, the mixed powder in a state in contact with a WC-6% Co cemented carbide disc and Co foil was charged into a Ta container and vacuum-sealed. This was sintered at 7.0 GPa and 1700° C. for 15 minutes, using a belt-type super-high pressure and temperature generation device. Thereby, a cBN sintered body was fabricated.

Experiment Example 2

A cBN sintered body was fabricated by the same method as that in experiment example 1, except that the introduced hexylamine had a concentration of 8.2 weight percent, and the organic cBN powder and the binder source material powder were blended at a ratio of the organic cBN powder:the binder source material powder=95:5 in volume percent. When the organic cBN powder was subjected to gas chromatography mass spectroscopy, it was confirmed that 439 ppm of hexylamine existed with respect to cBN.

Experiment Example 3

A cBN sintered body was fabricated by the same method as that in experiment example 1, except that the introduced hexylamine had a concentration of 9.5 weight percent, and the organic cBN powder and the binder source material powder were blended at a ratio of the organic cBN powder:the binder source material powder=92:8 in volume percent. When the organic cBN powder was subjected to gas chromatography mass spectroscopy, it was confirmed that 557 ppm of hexylamine existed with respect to cBN.

Experiment Example 4

A cBN sintered body was fabricated by the same method as that in experiment example 1, except that the introduced hexylamine had a concentration of 20.0 weight percent, and the organic cBN powder and the binder source material powder were blended at a ratio of the organic cBN powder:the binder source material powder=92:8 in volume percent. When the organic cBN powder was subjected to gas chromatography mass spectroscopy, it was confirmed that 1278 ppm of hexylamine existed with respect to cBN.

Experiment Example 5

Organic cBN powder was fabricated by plasma treatment, instead of the method by using supercritical water. Specifically, the surface of the cBN source material powder was etched under a CF4 atmosphere, using a plasma modification device (low-pressure plasma device FEMTO manufactured by Dienner), and then the atmosphere inside the device was switched to an $NH_3$ atmosphere to treat the etched cBN source material powder. Except for the above, a cBN sintered body was manufactured by the same method as that in experiment example 1.

Experiment Example 6

A cBN sintered body was manufactured by the same method as that in experiment example 2, except for performing plasma treatment described above instead of the method by using supercritical water.

Experiment Example 7

A cBN sintered body was manufactured by the same method as that in experiment example 3, except for performing plasma treatment described above instead of the method by using supercritical water.

Experiment Example 8

A cBN sintered body was manufactured by the same method as that in experiment example 4, except for performing plasma treatment described above instead of the method by using supercritical water.

Experiment Example 11

A cBN sintered body was manufactured by the same method as that in experiment example 3, except for not performing supercritical water treatment on the cBN source material powder.

Experiment Example 12

A cBN sintered body was manufactured by the same method as that in experiment example 3, except for not performing supercritical water treatment on the cBN source material powder, and changing the sintering temperature to 1800° C.

Experiment Example 13

A cBN sintered body was fabricated by the same method as that in experiment example 1, except that the organic cBN powder and the binder source material powder were blended at a ratio of the organic cBN powder:the binder source material powder=70:30 in volume percent.

Experiment Example 14

A cBN sintered body was fabricated by the same method as that in experiment example 1, except for not performing treatment using supercritical water, and using only the cBN source material powder without blending the binder source material powder.

In this manner, the cBN sintered bodies in experiment examples 1 to 8 and experiment examples 11 to 14 were fabricated. Here, experiment examples 1 to 8 correspond to examples, and experiment examples 11 to 14 correspond to comparative examples.

Evaluation of Characteristics

X-ray Diffraction Intensity Ratio

Using the X-ray diffraction device described above, the ratio $I_C/I_A$ and the ratio $I_C/I_B$ in each cBN sintered body were respectively calculated by the method described above. Table 1 shows the results. It should be noted that each of $I_A$, $I_B$, and $I_C$ c is an average value of measurement results at five arbitrary points in each test piece.

Composition of Binder

A test piece having a length of 6 mm, a width of 3 mm, and a thickness of 0.45 to 0.50 mm was cut out from each fabricated cBN sintered body, and XRD analysis was performed on the test piece. Then, each test piece was immersed in nitric hydrofluoric acid (a mixed acid having a mixing volume ratio of concentrated nitric acid (60%):distilled water:concentrated hydrofluoric acid (47%)=2:2:1) at 140° C. for 48 hours within a sealed container, to obtain an acid treatment liquid in which each binder was dissolved. ICP analysis was performed on the acid treatment liquid. Then, the composition of each binder was determined from the result of the XRD analysis and the result of the ICP analysis. Table 1 shows the results.

Hardness

Measurement with a load of 50 kgf was performed on each cBN sintered body using a Vickers hardness tester, and Vickers hardness (Hv) was calculated from the length of a diagonal line of an indentation. Table 1 shows the results.

Cutting Test

A cutting tool (base-material shape: DNGA150408, cutting edge treatment: T01225) was fabricated using each fabricated cBN sintered body. Using each cutting tool, a cutting test was performed under the following cutting conditions:
Cutting speed: 170 m/min.
Feeding speed: 0.07 mm/rev.
Cutting depth: 0.1 mm
Coolant: DRY
Cutting method: intermittent cutting
Lathe: LB400 (manufactured by Okuma Corp.)
Workpiece: sintered component (hardened sintered alloy D-40 manufactured by Sumitomo Electric Industries, Ltd., hardness of a hardened cutting portion: 40 HRC).

Each cutting edge was observed for each cutting distance of 0.3 km, to measure the amount of detachment of the cutting edge. The amount of detachment of the cutting edge was defined as a width for which the cutting edge receded from the position of a cutting edge ridgeline before cutting, due to wear. When the cutting edge had chipping, the amount of detachment of the cutting edge was defined as the size of the chipping. A cutting distance when the amount of detachment of the cutting edge was 0.05 mm or more was measured. It should be noted that this cutting distance was defined as an indicator of the life of each cutting tool. Table 1 shows the results.

TABLE 1

| | cBN (volume %) | Composition of Binder Phase | X-ray Intensity Ratio | | Hardness (Hv) | Cutting Distance (km) |
|---|---|---|---|---|---|---|
| | | | $I_C/I_A$ | $I_C/I_B$ | | |
| Experiment Example 1 | 85 | WC, Co, Al Compound, $W_2Co_{21}B_6$, $Co_3W_3C$ | 0.07 | 0.27 | 3600 | 1.63 |
| Experiment Example 2 | 95 | WC, Co, Al Compound, $W_2Co_{21}B_6$, $Co_3W_3C$ | 0.04 | 0.10 | 4200 | 1.86 |

TABLE 1-continued

| | cBN (volume %) | Composition of Binder Phase | X-ray Intensity Ratio $I_C/I_A$ | X-ray Intensity Ratio $I_C/I_B$ | Hardness (Hv) | Cutting Distance (km) |
|---|---|---|---|---|---|---|
| Experiment Example 3 | 92 | WC, Co, Al Compound | 0 | 0 | 3900 | 1.97 |
| Experiment Example 4 | 92 | WC, Co, Al Compound | 0 | 0 | 3800 | 1.75 |
| Experiment Example 5 | 85 | WC, Co, Al Compound $W_2Co_{21}B_6$, $Co_3W_3C$ | 0.09 | 0.39 | 3500 | 1.51 |
| Experiment Example 6 | 95 | WC, Co, Al Compound $W_2Co_{21}B_6$, $Co_3W_3C$ | 0.06 | 0.12 | 4100 | 1.72 |
| Experiment Example 7 | 92 | WC, Co, Al Compound $W_2Co_{21}B_6$, $Co_3W_3C$ | 0.03 | 0.06 | 3800 | 1.85 |
| Experiment Example 8 | 92 | WC, Co, Al Compound $W_2Co_{21}B_6$, $Co_3W_3C$ | 0.02 | 0.04 | 3700 | 1.73 |
| Experiment Example 11 | 92 | WC, Co, Al Compound $W_2Co_{21}B_6$, $Co_3W_3C$ | 0.1 | 0.46 | 3400 | 0.70 |
| Experiment Example 12 | 92 | WC, Co, Al Compound, $W_2Co_{21}B_6$, $Co_3W_3C$ | 0.4 | 0.68 | 3200 | 0.61 |
| Experiment Example 13 | 70 | WC, Co, Al Compound, $W_2Co_{21}B_6$, $Co_3W_3C$ | 0.09 | 0.39 | 2700 | 0.46 |
| Experiment | 100 | — | — | — | 3100 | 0.42 |

Table 1 also shows the volume percent of the cBN particles in each cBN sintered body. The column indicated by "–" in Table 1 shows that each value is less than or equal to a detection limit.

Referring to Table 1, it was continued that WC, Co, and an Al compound existed in experiment examples 1 to 8 and experiment examples 11 to 13. It should be noted that, since a clear peak was not detected in XRD for the Al compound, it was presumed that the Al compound was a composite compound made of a plurality of Al compounds. In addition, it was confirmed that $W_2Co_{21}B_6$ and $Co_3W_3C$ existed in the experiment examples other than experiment examples 3 and example 4 (that is, experiment examples 1, 2, and 5 to 8 and experiment examples 11 to 13).

Although the reason why $W_2Co_{21}B_6$ and $Co_3W_3C$ were not confirmed in experiment examples 3 and 4 is not clear, it is considered that generation of these compounds was suitably suppressed because a suitable amount of carbon was bonded to the organic cBN powder.

In addition, as shown in experiment examples 1 to 8, a high hardness and a long cutting distance were achieved when the ratio $I_C/I_A$ was less than 0.10 and the ratio $I_C/I_B$ was less than 0.40. The length of the cutting distance means extension of the life of the cBN sintered body. In addition, in experiment examples 2 to 4, 7, and 8, the ratio $I_C/I_A$ was less than 0.05 and the ratio $I_C/I_B$ was less than 0.20, and a particularly long life was achieved in this case. Especially in experiment example 3, each ratio was 0, that is, $W_2Co_{21}B_6$ was not contained in the cBN sintered body, and a particularly significantly long life was confirmed in this case.

In contrast, experiment examples 11 to 14 exhibited significantly low results in terms of both hardness and life, when compared with experiment examples 1 to 8. These results are considered as follows. In experiment examples 11 and 12, since bonding of an organic substance was not performed, a large amount of $W_2Co_{21}B_6$ was generated, and as a result, detachment of the cBN particles occurred frequently, and the hardness was low. In experiment example 13, since the ratio of the cBN particles was low (that is, the cBN sintered body was not a high-cBN sintered body), the hardness and life thereof were insufficient. In experiment example 14, since there was no binder, sintering of the cBN particles was insufficient.

It should be understood that the embodiments disclosed herein are illustrative and non-restrictive in every respect. The scope of the present invention is defined by the scope of the claims, rather than the embodiments described above, and is intended to include any modifications within the scope and meaning equivalent to the scope of the claims.

The invention claimed is:

1. A cubic boron nitride sintered body comprising more than or equal to 85 volume percent and less than 100 volume percent of cubic boron nitride particles, and a remainder of a binder, wherein
    the binder contains WC, Co, and an Al compound,
    the binder contains $W_2Co_{21}B_6$, and
    when $I_A$ represents an X-ray diffraction intensity of a (111) plane of the cubic boron nitride particles, $I_B$ represents an X-ray diffraction intensity of a (100) plane of the WC, and $I_C$ represents an X-ray diffraction intensity of a (420) plane of the $W_2Co_{21}B_6$,
    a ratio $I_C/I_A$ of the $I_C$ to the $I_A$ is more than 0 and less than 0.10, and
    a ratio $I_C/I_B$ of the $I_C$ to the $I_B$ is more than 0 and less than 0.40.

2. The cubic boron nitride sintered body according to claim 1, wherein
    the ratio $I_C/I_A$ is more than 0 and less than 0.05, and
    the ratio $I_C/I_B$ is more than 0 and less than 0.20.

3. A cubic boron nitride sintered body comprising more than or equal to 85 volume percent and less than 100 volume percent of cubic boron nitride particles, and a remainder of a binder, wherein
    the binder contains WC, Co, and an Al compound, and
    the binder does not contain $W_2Co_{21}B_6$.

4. A cutting tool comprising the cubic boron nitride sintered body according to claim 1.

5. A cutting tool comprising the cubic boron nitride sintered body according to claim 2.

6. A cutting tool comprising the cubic boron nitride sintered body according to claim 3.

* * * * *